(12) United States Patent
Xiao

(10) Patent No.: US 8,290,281 B2
(45) Date of Patent: Oct. 16, 2012

(54) SELECTIVE PRESENTATION OF IMAGES

(75) Inventor: Jun Xiao, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 461 days.

(21) Appl. No.: 12/572,940

(22) Filed: Oct. 2, 2009

(65) Prior Publication Data

US 2011/0081088 A1    Apr. 7, 2011

(51) Int. Cl.
 *G06K 9/62* (2006.01)
 *G09G 5/00* (2006.01)
(52) U.S. Cl. .......................... 382/224; 345/660
(58) Field of Classification Search .................. None
 See application file for complete search history.

(56) References Cited

U.S. PATENT DOCUMENTS

2003/0085913 A1* 5/2003 Ahmad et al. ............... 345/730
2006/0259863 A1* 11/2006 Obrador et al. .............. 715/723

OTHER PUBLICATIONS

"Picasa Web Albums Uploader for the Mac" [video, online], 2007, screenshots captured from the Internet on Feb. 9, 2012, from <http://www.youtube.com/watch?v=1KiDiah4DoA>, pp. 1-14.*
Xiao, Mixed-Initiative Photo Collage Authoring, Oct. 26-31, 2008, MM, pp. 1-10.*
Rubner, Yossi et al, "A Metric for Distributions with Applications to Image Databases", Proc. of the 1998 IEEE Int'l Conf on Computer Vision, Bombay, India.
Xiao, Jun et al, "Mixed-Initiative Photo Collage Authoring".
Viola, Paul et al, "Robust Realtime Object Detection", 2nd Int'l Wksp on Statistical and Computational Theories of Vision—Modeling, Learning, Computing and Sampling.

* cited by examiner

*Primary Examiner* — Jingge Wu
*Assistant Examiner* — David F Dunphy

(57) ABSTRACT

A method for the selective presentation of a plurality of images from a set of digital images provided for upload to a computing apparatus, the method comprising providing image data representing the set of digital images for upload, processing said image data in order to determine for respective ones of the images in the set a measure for: i) image quality ranking, ii) duplicate image detection, and iii) face detection; and, on the basis of the determination generating data representing a slideshow for the plurality of images.

20 Claims, 2 Drawing Sheets

SELECTIVE PRESENTATION OF IMAGES

BACKGROUND

After capturing images with a device such as a digital camera, there is a requirement to transfer the digital images to a computer or other personal device so that they can be printed, shared, and backed up for safe keeping for example. There are numerous solutions for importing digital pictures to a computer or similar device. The most common comprises connecting the digital camera to a computer to allow images to be uploaded to a storage device of the computer. Once the images are stored on the computer, they can subsequently be erased from the camera freeing up memory so that more pictures can be taken.

Once stored on a computer, the transferred images can be viewed using a larger screen, which can help a user decide which ones are worth keeping. Some digital cameras come with software that helps a user copy pictures from your camera to a computer for example.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

Figure 1:
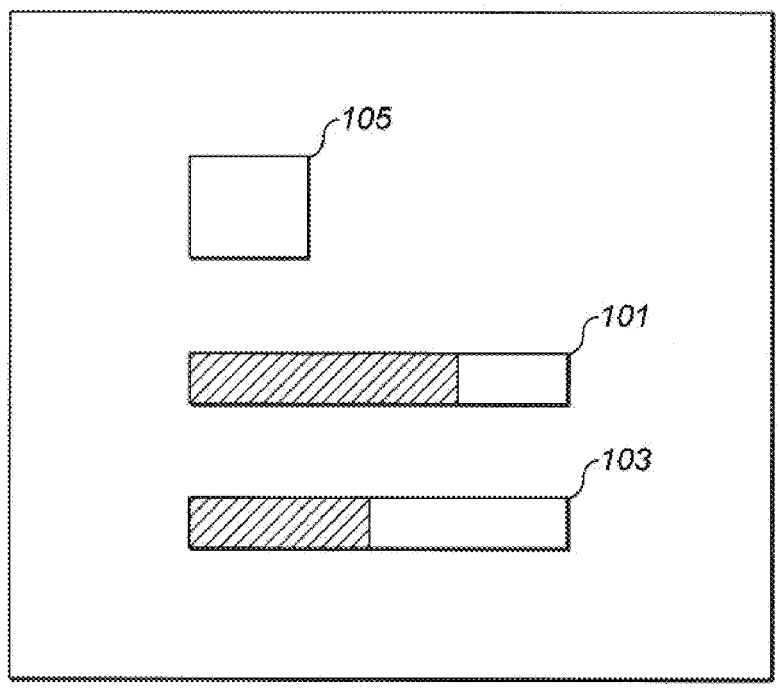
FIG. 1 is a schematic representation of an exemplary prior art upload screen.

FIG. 1 is a schematic representation of an exemplary prior art upload screen. During a process in which a set of images are uploaded from a device such as a digital camera to a computing apparatus such as a personal computer, a progress bar indicator 101 displays a portion of an image which has been transferred from a memory of the device to a storage device of the computer. A further progress indicator bar 103 can be present which shows the overall progress considering all images to be transferred. An image which is currently being transferred can be displayed to a user in a window 105 as a low resolution thumbnail image.

Each image being transferred is displayed as a low resolution thumbnail image in window 105.

According to an embodiment, a progress bar which is used to indicate the rate and progress of an upload process is replaced by a sliding photo strip which can take the form of a slideshow that shows the copying/uploading progress. All images can be shown in sequence on the photo strip. A full size view of images from a capture device, such as, a digital camera for example, being copied or uploaded is also shown.

Not all images from the capture device are shown in the full size view. According to an embodiment, only images with high quality scores based on image analysis results are included. Also, only one representative photo from a group of duplicates is shown. Finally, in addition to traditional fade/zoom effect, advanced transitions between images are generated using image analysis results. For example, instead of randomly zooming in/out a photo, the focus point is chosen at the face area based on face detection result instead of the people's belly.

As mentioned, not all images are shown in the full size view. Only images with high quality scores based on image analysis results are included. According to an embodiment, the image selection process involves three image analyses: a) image quality ranking, b) duplicate detection, and c) face detection.

In a) two image content-based measures are applied. The "blurry" measure is based on statistics relating to image edge strengths. The "boring" measure is based on color variation analysis using a fast image segmentation algorithm, such as that described in P Cheatle. "A fast segmentation and saliency algorithm", ACM MultiMedia, October 2008, the contents of which are incorporated herein by reference in their entirety.

Image quality is a general concept that has many dimensions. For example, a good photo should have relatively good exposure, contrast, and color, in addition to good composition, focus on the subject, and pleasing facial expressions. However, given the real-time requirement of the system according to an embodiment, a balanced compromise in determining the relative quality of an image is to mainly focus on avoiding images which are blurred, that is to say, images in which there is a consistent amount of blur for the entire image due to camera shake or motion blur or there is a large out of focus region which extends across all, or a large proportion of the main subject of an image.

Blur in images often results from motion or lack of focus. Regardless of the cause, blur weakens the major edges in images. According to an embodiment, a formulation of sharpness score, Q, is defined as:

$$Q = \frac{\text{strength}(e)}{\text{entropy}(h)}$$

where strength(e) is the average edge strength of the top 10% strongest edges and entropy(h) is the entropy of the normalized edge strength histogram. Intuitively, non-blur images have stronger edges and a more peaky edge strength distribution, therefore a large strength(e) and smaller entropy(h), will result in a larger value of Q.

In b), two types of features are extracted in real-time: time stamps of the image taken and color blobs extracted using the fast segmentation algorithm referenced above. Given two images X, Y, we can construct the duplicate detection function Dup(X,Y) by building classifiers on the time difference feature Dt(X,Y) and color distance feature Dc(X,Y) based on the Earth Mover Distance (EMD) distance. A process for implementing such a detection system is described in Rubner, Y., Tomasi, C. and Guibas, L. J. A Metric for Distributions with Applications to Image Databases. ICCV, 1998, the contents of which are incorporated herein by reference in their entirety. This function Dup(X,Y) is then applied on every possible pair of images in the sequence, and a duplicate graph is constructed, where two image nodes are connected if, and only if, they are duplicates.

Duplicate detection can be based on similarity only. However, duplicate shots are often taken close in time. Consequently, time information from images can be used if it is available. According to an embodiment, it is possible to use two different binary classifiers, each capable of deciding whether two arbitrary photos are duplicates: one using both similarity and time, and the other using only similarity.

To train the classifiers, a set of pairs of consumer images can be classified, in which certain pairs are near-duplicates and other of the pairs are non-duplicates.

In c) a Viola-Jones face detection algorithm such as that described in Robust Real Time Objection Detection by Paul Viola and Michael J Jones available at http://www.hpl.hp.com/techreports/Compaq-DEC/CRL-2001-1.pdf for example, the contents of which are incorporated herein by reference in their entirety, is used to detect the number of faces in the images.

Each image is assigned a composite quality score that is a weighted combination of the above three metrics. According to an embodiment, images having high image quality ranking, less duplicates and more faces detected are assigned higher quality scores.

Given the real-time constraints of a slideshow application according to an embodiment, the image sharpness metric is used as the primary quality measure for images. That is, blurry images will have a relatively lower quality score compared to images which are considered sharp within a desired metric.

Other more computationally expensive image analysis operations, such as exposure, contrast, and color analysis can also be applied to measure the image quality if the real-time constraint is relaxed.

The formulation of composite quality score, C, can be described as the following:

$$C = k_1 Q - k_2 D + k_3 F$$

Where Q is the normalized image quality score defined above, D is the normalized number of duplicates, and F is the normalized number of faces detected. k1, k2, k3 are weight constants that can be derived from default settings or user preferences.

Once all quality scores are calculated, a threshold is set by the desired onscreen time for each individual photo in the slideshow or the desired percentage of images to be shown in the slideshow. Only images with quality score higher than the threshold are included in the slideshow.

Figure 2:
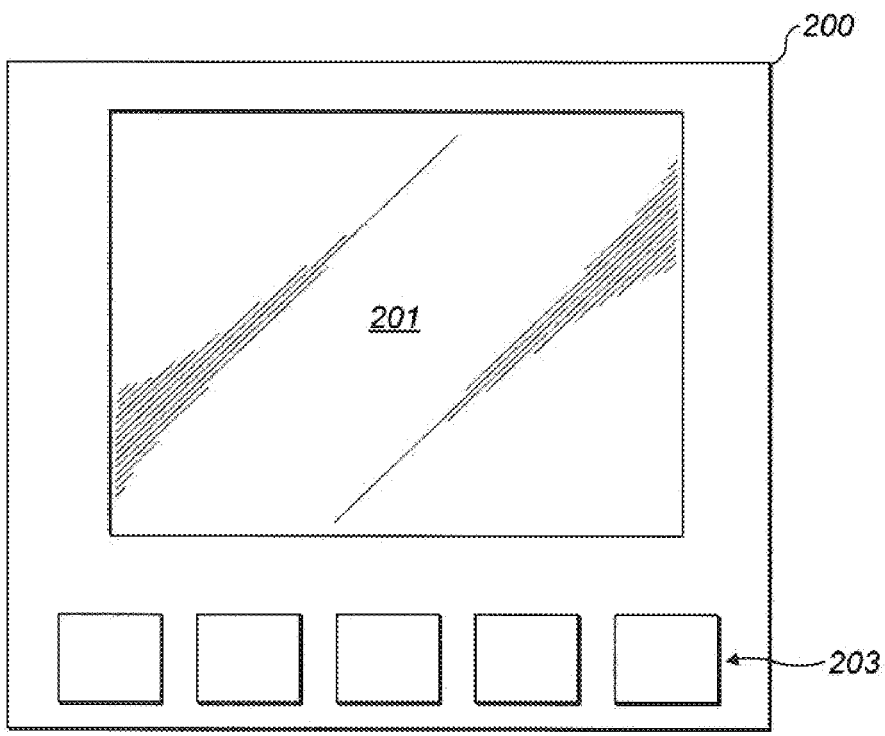
FIG. 2 is a schematic representation of an upload screen according to an embodiment.

FIG. 2 is a schematic representation of an upload screen according to an embodiment. In an viewing area 200 of a display device, such as a monitor of a computing apparatus for example, there is displayed to a user a higher resolution image 201 which represents an image currently being uploaded from a memory of a device such as a digital camera for example to a storage device of the computing apparatus. In order to determine an image to be displayed as a higher resolution image, the steps described above are performed. That is to say, from the set of images for transfer from the device to the computing apparatus, each image in the set is allocated a quality score based on the image parameters described above.

Given the number of images to be transferred to the computing apparatus, an estimate can be made using a processing device of the apparatus which indicates the amount of time it will take to transfer the desired images from the device to the computing apparatus given the bandwidth of the connection between the device and the apparatus (which can be a wired or wireless connection). Given the estimated time for transfer, the apparatus can set a threshold quality value taking into account a minimum amount of time to display respective ones of the higher resolution images to a user. For example, if the individual image file size is large and/or the connection is slow, the time to complete the transfer maybe relatively long, and so more images can be displayed as higher resolution versions. In this case, the apparatus can determine a lower threshold quality score in order to ensure that the time taken to transfer the images is filled with a slideshow of different images.

Conversely, given a relatively short period of time for transfer (if, for example, the image file size is small and/or the connection is fast), the apparatus can set a higher threshold quality score, which results in less photos being shown in the slideshow, in order to keep up with the speed of image transfer.

A thumbnail film strip 203 of images can be presented in another area of the viewing area 200. It should be noted that the relative placement and scale of elements in FIG. 2 are, not intended to be limiting. It will be appreciated that alternatives placement schemes, positions, sizes etc can be implemented. The film strip 203 can show all the images to be transferred as lower resolution thumbnail version, irrespective of quality score. That is to say, all images to be transferred can be shown in the strip 203 (which can, for example, scroll as an image is successfully transferred), with only images whose quality score is above the threshold score being displayed as a higher resolution version in the viewing area 201.

Figure 3:
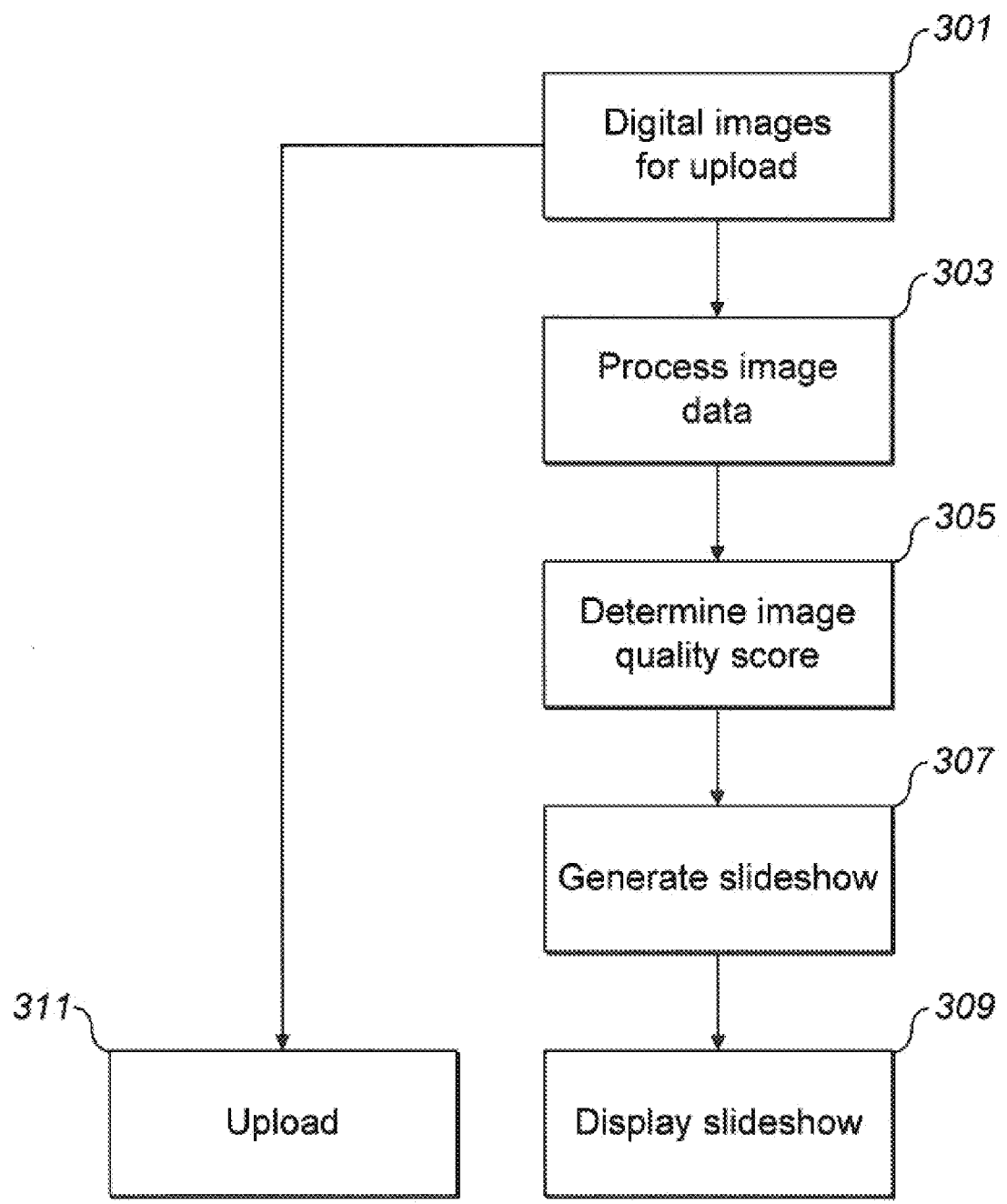
FIG. 3 is a flow diagram describing a method according to an embodiment.

FIG. 3 is a flow diagram describing a method according to an embodiment. In step 301, a set of digital images is provided. The digital images can be in the form of digital data present in a memory storage device of a digital camera for example, or can be data stored on a storage device of a computer. The data, irrespective of the location of its storage is to be transferred to another device, such a computing apparatus for example. At step 303, the image data is processed using a processor of the computing apparatus. Alternatively, the image data can be processed using a processor of the capture device before the transfer occurs. That is to say, the capture device can be ready to 'feed' the necessary data to a device to which the images are to be transferred before the transfer occurs.

At step 305, the following is determined for respective ones of the images in the set to be transferred: i) image quality ranking; ii) duplicate image detection, and iii) face detection; and, on the basis of the determination generating data representing a quality score for respective ones of the images. Using the quality score, a slideshow for the plurality of images can be generated (step 307). The slideshow, represented by slideshow data, can be determined on the basis of total time to transfer the set of images and a desired time to display respective images. A time for the display of respective images can be predefined, or input by a user. For example, each image in the slideshow can be automatically displayed for 3 seconds. Alternatively a user can be prompted to enter a time for display, either before, or during the transfer process. The quality score threshold can be adjusted as required in order to ensure that only higher quality images are displayed to a user, and that the slideshow is of substantially the same duration as the time for the transfer to occur.

At step 309, a slideshow is presented to a user using a display device and the slideshow data derived above. Concurrently with the slideshow display, the set of images to be transferred is uploaded to the machine in question (step 311).

It is to be understood that the above-referenced arrangements are illustrative of the application of the principles disclosed herein. It will be apparent to those of ordinary skill in the art that numerous modifications can be made without departing from the principles and concepts of this disclosure, as set forth in the claims below.

What is claimed is:

1. A method for selective presentation of images from a set of digital images provided for upload to a computing apparatus, the method comprising:

providing image data representing the set of digital images for upload;

processing said image data to determine an amount of time for the upload of the images, and determine a composite quality score for respective ones of the images based on:
  i) image quality ranking,
  ii) duplicate image detection, and
  iii) face detection;
and, on the basis of the determination of the amount of time for the upload and the composite quality score, generating data representing a slideshow of select images from the images to be uploaded, the slideshow to be concurrently displayed during the upload, and a duration of the slideshow defined to be substantially the same as the amount of time for the upload.

2. A method as claimed in claim 1, wherein one image of the select images for the slideshow and a thumbnail strip of the images to be uploaded are to be concurrently displayed during the upload.

3. A method as claimed in claim 1, wherein the composite quality score is a weighted combination of the image quality ranking, the duplicate image detection, and the face detection.

4. A method as claimed in claim 1, wherein an image having relatively high image quality ranking, relatively few duplicates, and relatively more faces detected is assigned a relatively higher quality score.

5. A method as claimed in claim 1, further comprising adjusting a threshold of a minimum value of the composite quality score for selection of the images for the slideshow to define the duration of the slideshow to be substantially the same as the amount of time for the upload.

6. A method as claimed in claim 5, wherein the threshold is lowered to increase a number of images selected for the slideshow and increase the duration of the slideshow, and wherein the threshold is raised to reduce a number of images selected for the slideshow and reduce the duration of the slideshow.

7. A method as claimed in claim 1, wherein the amount of time for the upload is an estimated time for transfer of the images based on a file size of the images to be uploaded and a bandwidth of a connection between the computing apparatus and a device from which the images are to be uploaded.

8. A method as claimed in claim 1, wherein processing is performed by the computing apparatus.

9. A method as claimed in claim 1, wherein the image quality ranking for respective ones of the images in the set is based on a sharpness of the image.

10. A method as claimed in claim 9, wherein a sharpness score, Q, for an image is defined as:

$$Q = \frac{\text{strength}(e)}{\text{entropy}(h)}$$

where strength(e) is the average edge strength of the top 10% strongest edges for an image and entropy(h) is the entropy of the normalized edge strength histogram for the image in question.

11. A method as claimed in claim 1, wherein the composite quality score, C, is defined as:

$$C = k_1 Q - k_2 D + k_3 F$$

where Q is a normalized image quality score, D is a normalized number of duplicates, and F is a normalized number of faces detected, and wherein k1, k2, and k3 are weight constants derived from default settings or user preference settings.

12. A system comprising computer-readable media encoded with code defining a method for selective presentation of images from a set of digital images provided for upload to the system, comprising:
  providing image data representing the set of digital images for upload to the system;
  processing said image data using a processor of the system to determine an amount of time for the upload, and determine a composite score for respective ones of the images in the set based on:
    i) relative image quality of the images,
    ii) duplicate image detection between the images, and
    iii) face detection in the images;
  and, on the basis of the determination of the amount of time for the upload and the composite score, generating data for the system representing a slideshow of select images from the images to be uploaded, the slideshow to be concurrently displayed during the upload, and a duration of the slideshow defined to be substantially the same as the amount of time for the upload.

13. A system as claimed in claim 12 further comprising a display device comprising a main viewing area with respective portions therein for respectively displaying, during the upload, the slideshow and representations of the images in the set of digital images for upload.

14. A system as claimed in claim 13, wherein the representations of the images in the set are displayed in a resolution which is lower than that of the images which comprise the slideshow.

15. A system as claimed in claim 12, wherein the amount of time for the upload is based on a file size of the images to be uploaded and a bandwidth of a connection between the system and a device from which the images are to be uploaded.

16. A system as claimed in claim 12, further comprising defining a threshold for a minimum value of the composite score for selection of the images for the slideshow.

17. A system as claimed in claim 16, wherein the threshold is based on a desired time for respective ones of the images from the plurality of images to be displayed during the slideshow.

18. A system as claimed in claim 12, wherein the image quality for respective ones of the images in the set is generated by the system using data representing a sharpness of respective ones of the images.

19. A system as claimed in claim 12, wherein the system is operable to generate sharpness data representing a sharpness score, Q, for an image, the sharpness data defined using the relationship:

$$Q = \frac{\text{strength}(e)}{\text{entropy}(h)}$$

where strength(e) is the average edge strength of the top 10% strongest edges for an image and entropy(h) is the entropy of the normalized edge strength histogram for the image in question.

20. A system as claimed in claim 12, wherein the composite score, C, is generated by the system based on the relationship:

$$C = k_1 Q - k_2 D + k_3 F$$

where Q is a normalized image quality score, D is a normalized number of duplicates, and F is a normalized number of faces detected, and wherein k1, k2, and k3 are weight constants derived from default settings or user preference settings.

* * * * *